United States Patent
Williams

(10) Patent No.: US 6,199,795 B1
(45) Date of Patent: Mar. 13, 2001

(54) TWIN ENGINE AIRCRAFT

(76) Inventor: Samuel B. Williams, 1625 Lochridge, Bloomfield Hills, MI (US) 48302

(*) Notice: Subject to any disclaimer, the term of this patent is extended or adjusted under 35 U.S.C. 154(b) by 0 days.

(21) Appl. No.: 09/132,273

(22) Filed: Aug. 11, 1998

Related U.S. Application Data

(63) Continuation-in-part of application No. 08/897,771, filed on Jul. 21, 1997, now Pat. No. 5,957,405.

(51) Int. Cl.$^7$ .................................................. B64D 27/14
(52) U.S. Cl. ............................ 244/15; 244/53 B; 244/55; 244/130
(58) Field of Search .................................. 244/53 B, 15, 244/55, 36, 130; D12/343, 337

(56) References Cited

U.S. PATENT DOCUMENTS 3,060,685 * 10/1962 Tonnies et al. ...................... 244/55
3,455,523 * 7/1969 Hertel .................................... 244/55
5,114,097 * 5/1992 Williams .......................... 244/53 B

FOREIGN PATENT DOCUMENTS

1756250 * 3/1970 (DE) ..................................... 244/55
945365 * 4/1964 (GB) ..................................... 244/55
1041132 * 9/1966 (GB) ..................................... 244/55

* cited by examiner

Primary Examiner—Galen L. Barefoot
(74) Attorney, Agent, or Firm—Lyon P.C.

(57) ABSTRACT

A jet aircraft has a generally conical front fuselage section, a cylindrical intermediate fuselage section defining a passenger compartment, a generally conical aft fuselage section, and a single vertical stabilizer. The aircraft's propulsion engines are mounted on pylons on the conical aft fuselage section with the air inlets thereof disposed entirely within a rearward projection of the lateral cross section of the intermediate fuselage section thereby to preclude the ingestion of foreign objects into the engines while minimizing the effect of boundary layer airflow. The exhaust nozzles extend rearwardly past the vertical stabilizer to minimize side line noise.

1 Claim, 3 Drawing Sheets

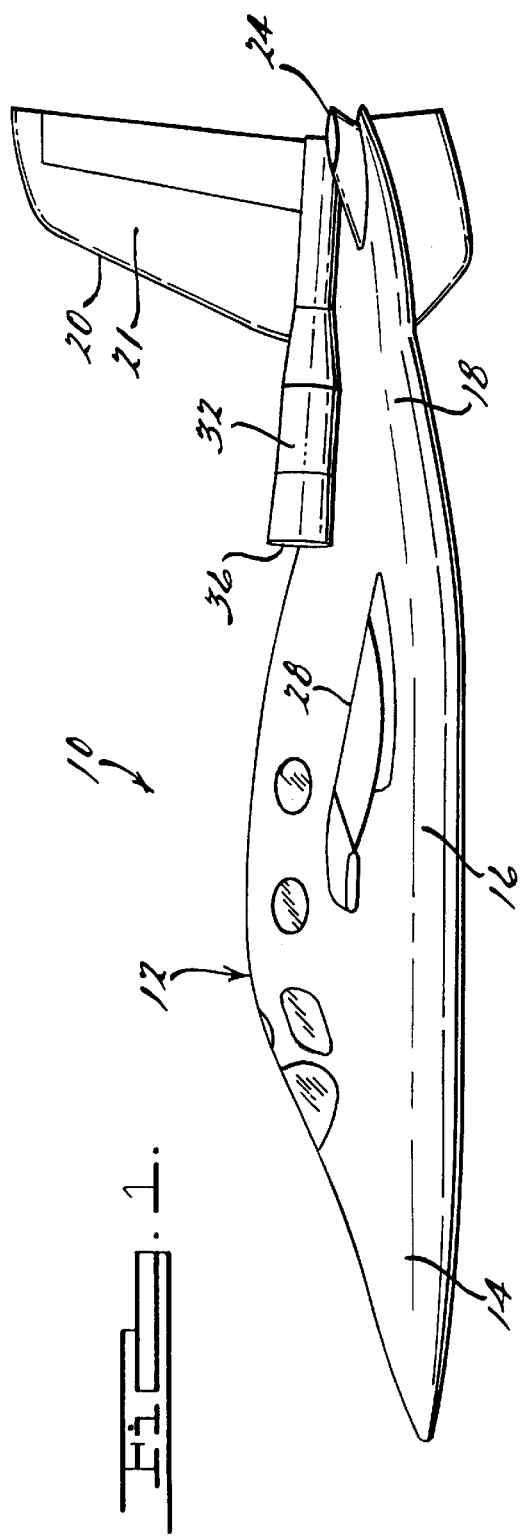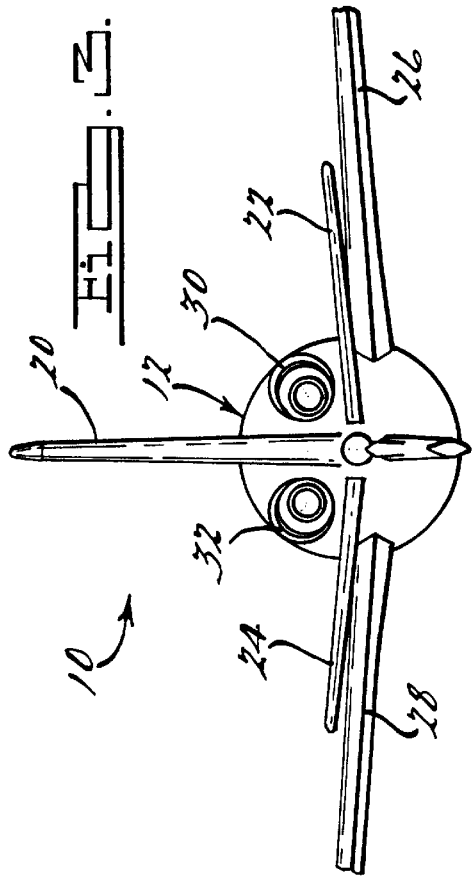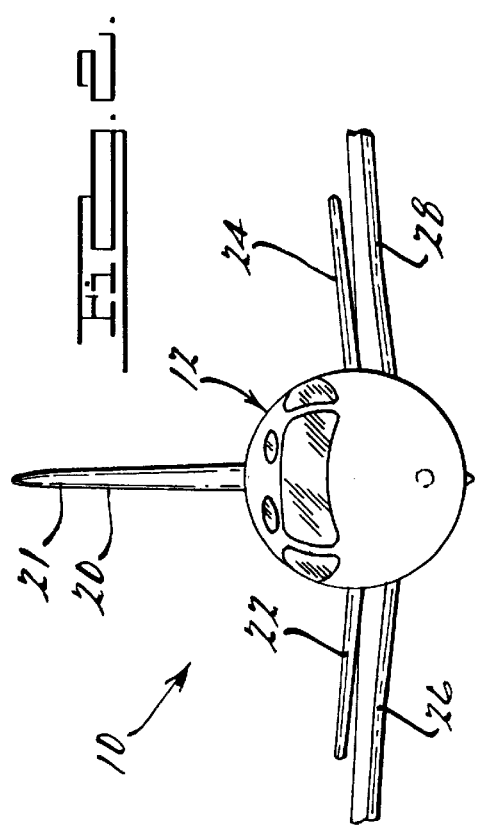

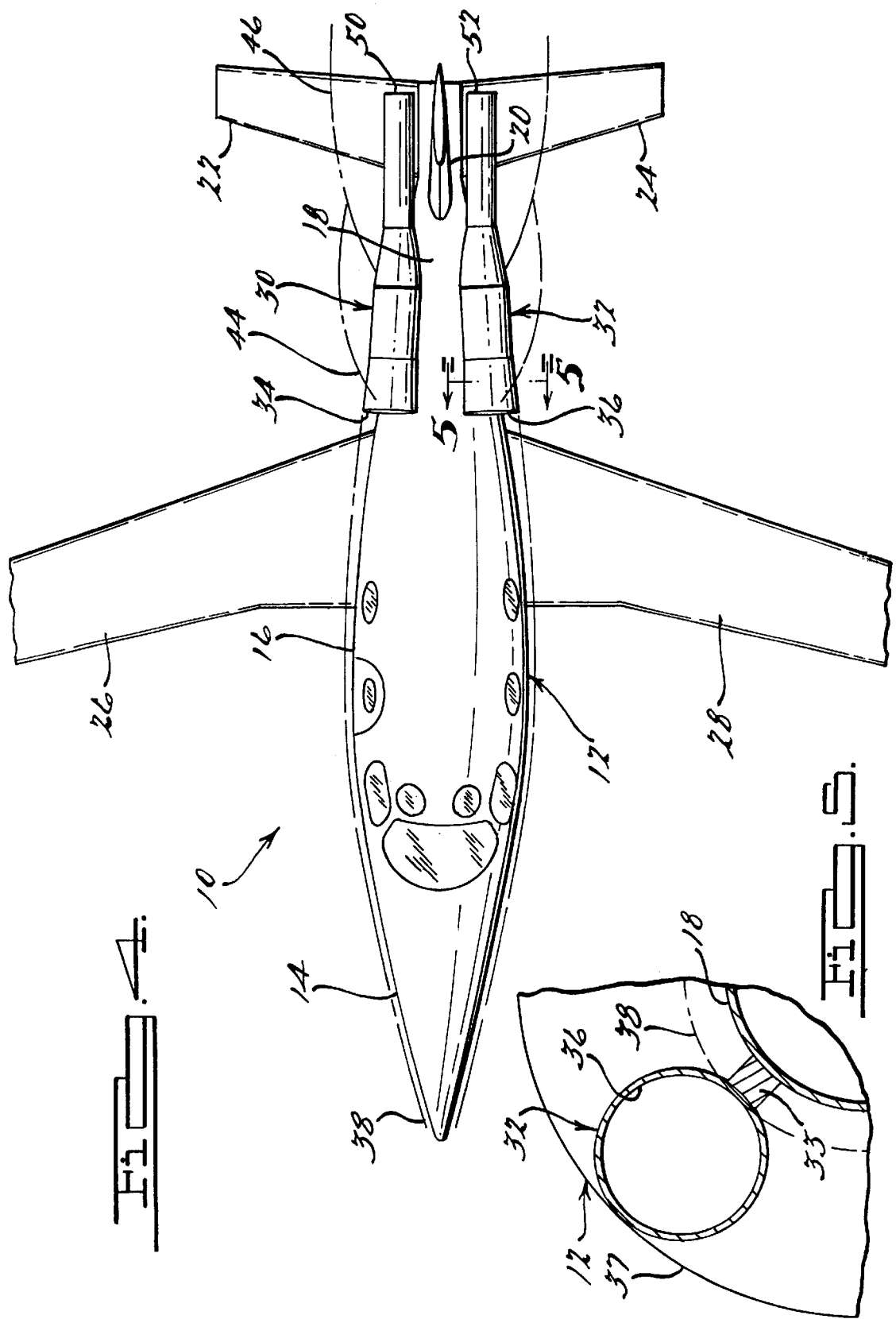

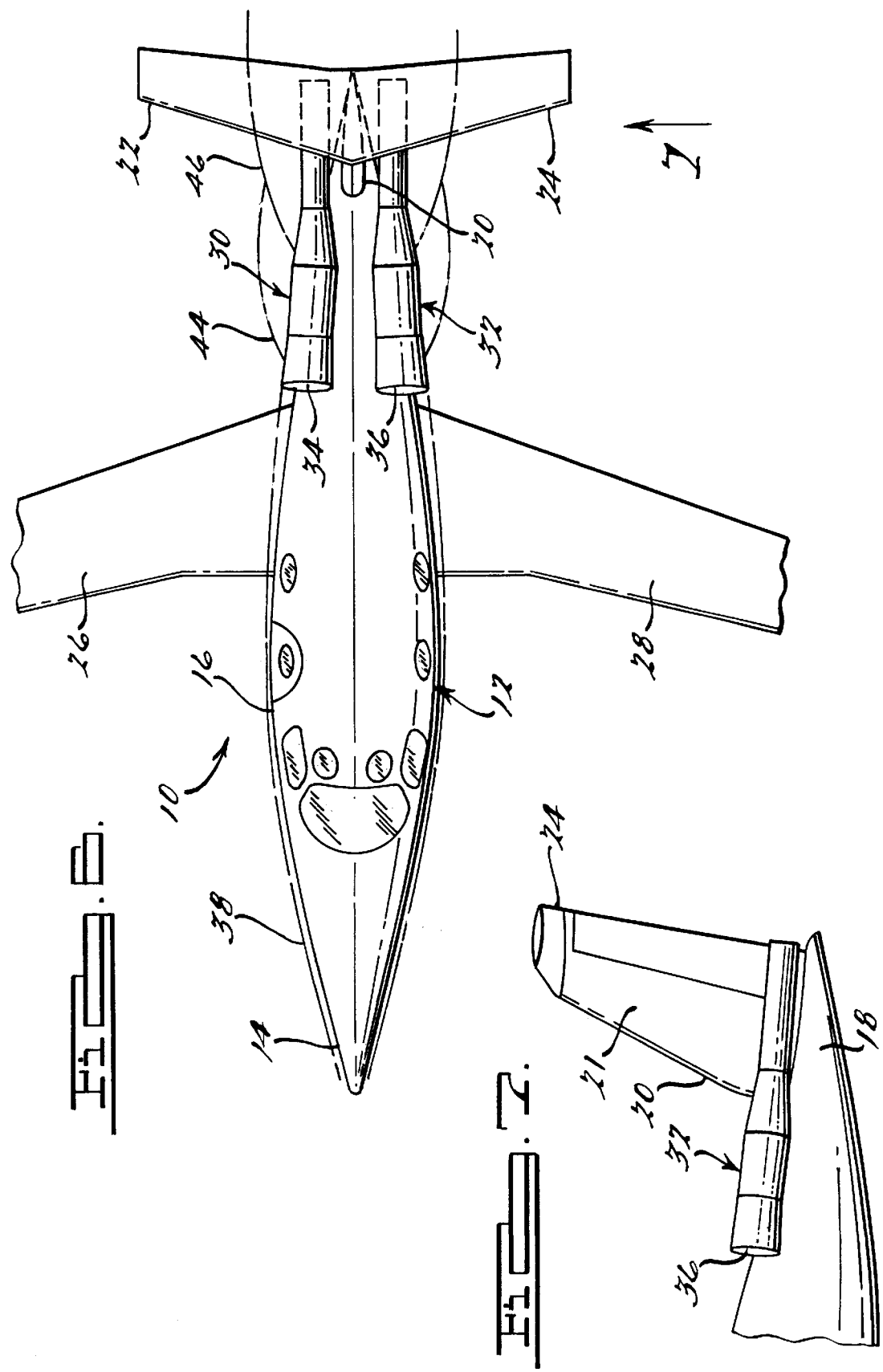

TWIN ENGINE AIRCRAFT

This application is a continuation-in-part of my application Ser. No. 08/897,771 filed Jul. 21, 1997 now U.S. Pat. No. 5,957,405.

The present invention relates to an aircraft having an airframe configuration and engine orientation that precludes the ingestion of foreign objects, for example, birds, into the aircraft's engines yet minimizes side line noise due to the reflection of jet exhaust on the vertical stabilizer of the aircraft.

BACKGROUND OF THE INVENTION

The propulsion system of an aircraft must be capable of ingesting foreign objects without engine damage. The problem of foreign object ingestion has been solved in the past by merely increasing the strength of the engine components exposed to impact damage. However, strength can be equated with weight, which, in turn, compromises performance of the aircraft. Reconciliation of such seemingly divergent performance and safety requirements requires careful integration of the aircraft's propulsion system with airframe aerodynamics.

The basic model of air flow past an aircraft fuselage assumes that air viscosity acts over a relatively thin region termed the boundary layer. The boundary layer exists in several states, namely, laminar, turbulent, wake and the external stream. In the laminar state, flow is stratified. Farther aft, laminar flow transforms into a turbulent state which is eddying in character. Turbulent flow subsequently transforms into a wake wherein the direction of flow may actually reverse.

While careful aerodynamic design can cause the boundary layer, whether laminar or turbulent, to remain attached to the aft fuselage at least to a point beyond the engine air inlets, relatively heavy foreign objects, for example, birds, tend to flow rearwardly of the aircraft outside the cylindrical surface defined by the maximum cross section of the fuselage due to their large inertial forces.

Thus, placement of the engines so that their inlets are entirely within the area defined by the forward (passenger) section of the fuselage (i.e., so that they cannot be seen by an observer located forwardly of the aircraft on the extended axis of the fuselage) precludes foreign object ingestion. At the same time, careful aerodynamic design can limit the boundary layer thickness at the engine inlet plane to a finite value so that a reasonable gap between the inner boundary of the inlet and the fuselage will permit the boundary layer to pass between the inlet and the fuselage and permit the inlet to ingest only high velocity free stream air thereby maintaining the high efficiency of the installation.

It is to be noted, however, that any solution to the problem of foreign object ingestion must take into consideration the problem of side line noise induced by close proximity of airframe appendages to high density or velocity airflow.

SUMMARY OF THE INVENTION

In accordance with the present invention, the engine air inlets of a jet aircraft are positioned within a rearward projection of the maximum lateral cross section of the center section of the fuselage so that ingestion of foreign objects into the engine air inlets is precluded while air flow to the engines is maintained. Side line noise is minimized by eliminating the effect of high velocity exhaust gases on the vertical stabilizer of the aircraft stabilizer by extending the engine nacelles and exhaust nozzles along both sides of the vertical stabilizer to the rearmost extremity thereof. More specifically, the jet aircraft of the present invention solves the aforesaid problems of foreign object ingestion and side line noise by (a) utilizing a conical aft fuselage or tail cone that, in a lateral plane containing the engine inlets, is significantly smaller in radial cross section than the maximum cross section of the main fuselage section (b) separating the engine air intakes from the fuselage to permit boundary layer air to pass between the fuselage and the engine air inlets, (c) placing the engine air inlets radially inwardly of a rearward projection of the main fuselage section yet in of the rearward flowing external stream and well forwardly of the separation point between turbulent flow and the wake and preferably forwardly of the separation point between boundary air flow and turbulent flow, and (d) extending the exhaust nozzle of each engine to the rear of the fixed portion of the vertical stabilizer.

BRIEF DESCRIPTION OF THE DRAWINGS

FIG. 1 is a side elevation view of an aircraft in accordance with a preferred embodiment of the present invention.

FIG. 2 is a front view of the aircraft of FIG. 1.

FIG. 3 is a rear view of the aircraft of FIG. 1 and

FIG. 4 is a top plan view of the aircraft of FIG. 1.

FIG. 5 is a sectional view taken along the line 5—5 of FIG. 4.

FIG. 6 is a view similar to FIG. 1 of the invention applied to a "T" tail configuration.

FIG. 7 is a view taken in the direction of the arrow "7" of FIG. 6.

DETAILED DESCRIPTION OF THE PREFERRED EMBODIMENT(S)

As seen in the drawings, a twin engine jet aircraft 10, comprises a fuselage 12 having a generally conical nose section 14, a generally cylindrical center section 16, and a generally conical aft fuselage section or tail cone 18. The aircraft 10 has a vertical stabilizer 20 with a fixed portion 21 and horizontal stabilizers 22 and 24. Forwardly swept wings 26 and 28 are joined to the fuselage 12 at the aft end of the center section 16, thereof.

In accordance with the present invention, a pair of jet engines 30 and 32 are mounted on pylons one of which is shown and designated by the numeral 33, on the tail cone 18 in spaced relation thereto. The engines 30 and 32 have air inlets 34 and 36, respectively, disposed entirely within theoretical a rearward projection 37 of the cylindrical center portion 16 of the fuselage 12.

As best seen in FIG. 4, air flow adjacent the fuselage 12 of the aircraft 10 comprises a boundary layer 38 that transitions to a turbulent zone 44 thence to a wake 46. Engine combustion air flowing externally of the boundary layer 38 enters the engine air inlets 34 and 36 forwardly of the turbulent zone 44. However, the inertia of heavy objects forced into the external air stream by the center section 16 of the fuselage 12 will preclude ingestion thereof into the engine air inlets 34 and 36.

As best seen in FIG. 5 of the drawings, and in accordance with another feature of the present invention, the air inlet 36 of the engine 32 is disposed outwardly of the boundary layer 38 in the external stream of fuselage 12 thereby to maximize ingestion of air into the engine 32.

While the aforesaid orientation of the engines 30 and 32 solves the heavy object ingestion problem, it complicates the problem of side line noise. Accordingly, in accordance with one feature of the instant invention, the exhaust nozzles 50 and 52 of the engines 30 and 32, respectively, extend rearwardly past the fixed portion 21 of the vertical stabilizer 20, thus minimizing reflection of the exhaust gases on the vertical stabilizer 20 thereby attenuating side line noise due to the influence of boundary layer air 38 flowing between the engines 30 and 32 and the vertical stabilizer 20.

While the preferred embodiment of the invention has been disclosed, it should be appreciated that the invention is susceptible of modification without departing from the scope of the following claims.

I claim:
1. In a jet engine aircraft comprising a generally cylindrical intermediate fuselage section defining a passenger compartment, a generally conical aft fuselage section, and a vertical stabilizer having a fixed portion extending upwardly from said aft fuselage section, the improvement comprising;
   a pair of propulsion engines mounted directly on the aft fuselage section of said aircraft on opposite sides of said vertical stabilizer in spaced relation thereto and to said aft fuselage section, said engines having air inlets, respectively disposed entirely within a rearward projection of the maximum lateral cross section of said intermediate fuselage section.

\* \* \* \* \*